(12) United States Patent
Iizaka et al.

(10) Patent No.: US 8,458,036 B2
(45) Date of Patent: Jun. 4, 2013

(54) DATACODE READING APPARATUS

(75) Inventors: Hitoshi Iizaka, Shizuoka (JP); Yoshiya Yamada, Shizuoka (JP); Hidemi Mihara, Shizuoka (JP); Osamu Tsuchiya, Shizuoka (JP); Hidehiro Naitou, Tokyo (JP)

(73) Assignee: Toshiba Tec Kabushiki Kaisha (JP)

( * ) Notice: Subject to any disclaimer, the term of this patent is extended or adjusted under 35 U.S.C. 154(b) by 1106 days.

(21) Appl. No.: 12/358,875

(22) Filed: Jan. 23, 2009

(65) Prior Publication Data

US 2009/0192909 A1   Jul. 30, 2009

(30) Foreign Application Priority Data

Jan. 24, 2008   (JP) ................... 2008-013952

(51) Int. Cl.
*G06Q 40/00*   (2012.01)
(52) U.S. Cl.
USPC .......................................................... 705/20
(58) Field of Classification Search
CPC .................................................... G06Q 40/00
USPC .............................................................. 705/20
See application file for complete search history.

(56) References Cited

U.S. PATENT DOCUMENTS

2008/0073434 A1 * 3/2008 Epshteyn et al. ............. 235/454

FOREIGN PATENT DOCUMENTS

| JP | 2005-086356 | 3/2005 |
| JP | 2005-122609 | 5/2005 |
| JP | 2005-261642 | 9/2005 |
| JP | 2006-235719 | 9/2006 |
| JP | 2006-238459 | 9/2006 |
| JP | 2006-277198 | 10/2006 |
| JP | 2007-241527 | 9/2007 |

OTHER PUBLICATIONS

Ohbuchi, Hanaizumi and Hock, Barcode Readers using the Camera Device in Mobile Phones, 2004, IEEE.*

* cited by examiner

*Primary Examiner* — Jessica Lemieux
(74) *Attorney, Agent, or Firm* — Harness, Dickey & Pierce, P.L.C.

(57) ABSTRACT

When decoding a datacode based on moving image data output from an image sensing device, moving image data output from the image sensing device is input. An image display output unit processes the moving image data and displays it on the display screen of a display as a real-time moving image.

18 Claims, 3 Drawing Sheets

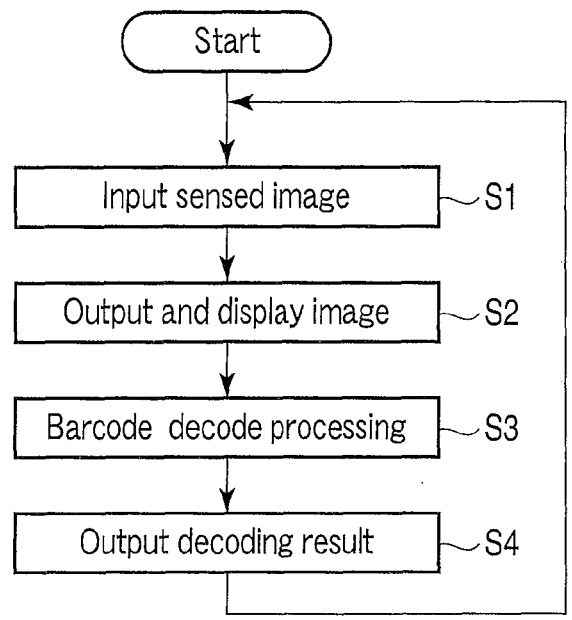
F I G. 3
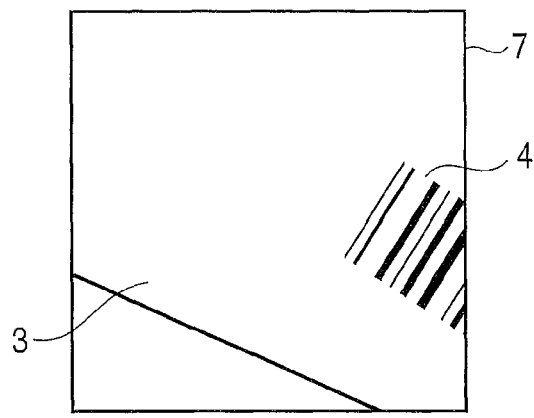
F I G. 4

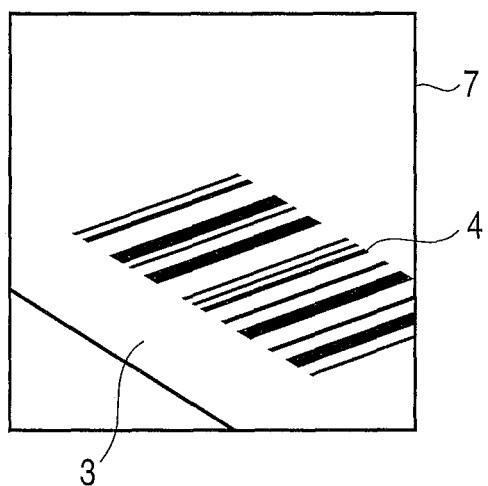
F I G. 5
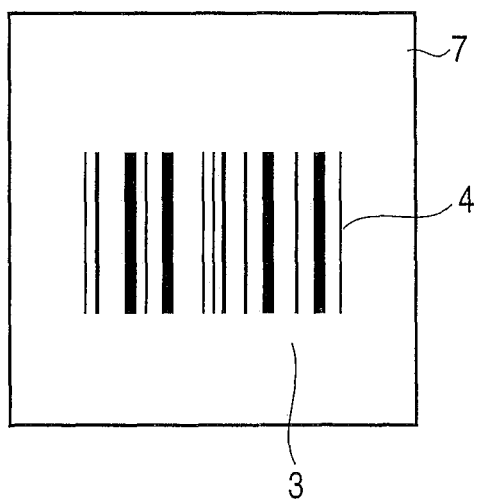
F I G. 6

DATACODE READING APPARATUS

CROSS-REFERENCE TO RELATED APPLICATIONS

This application is based upon and claims the benefit of priority from prior Japanese Patent Application No. 2008-013952, filed Jan. 24, 2008, the entire contents of which are incorporated herein by reference.

BACKGROUND OF THE INVENTION

1. Field of the Invention

The present invention relates to a datacode reading apparatus for reading a datacode such as a barcode attached to an item of merchandise.

2. Description of the Related Art

In a store such as a supermarket or a convenience store, checkout is carried out to receive payment for purchases. In the checkout, a datacode reading apparatus is used to read datacodes such as barcodes attached to items of merchandise. Popular datacode reading apparatuses employ a laser system which reads a datacode by scanning a laser beam.

The datacode reading apparatus using the laser system is installed at a checkout counter. At the checkout counter, an operator removes items of merchandise from a shopping basket one by one and directs each item of merchandise to the datacode reading apparatus so that a laser beam scans across a datacode attached to the item of merchandise, thereby registering each item of merchandise.

A technique associated with the datacode reading apparatus using the laser system is disclosed in, e.g., Jpn. Pat. Appln. KOKAI Publication No. 2006-277198. The apparatus disclosed in Jpn. Pat. Appln. KOKAI Publication No. 2006-277198 has an image sensing unit capable of adjusting a normal mode to read merchandise identification information such as a merchandise code pasted to each item of merchandise and a merchandise image sensing mode to sense the outer appearance of each item of merchandise. When a merchandise code is read, and merchandise registration information corresponding to the merchandise code is not registered in a file, a merchandise image sensed by the image sensing unit in correspondence with the merchandise code is additionally registered in a file together with the unit price.

The operator of the datacode reading apparatus cannot visually recognize the laser beam when operating the datacode reading apparatus using the laser system. Hence, the operator is trained to be able to reliably register an item of merchandise by directing it to the datacode reading apparatus so that the laser beam scans across the datacode attached to the item of merchandise. The operator acquires the sense of operation of directing the datacode to the datacode reading apparatus by training.

However, the datacode reading does not necessarily succeed when the operator directs a datacode attached to an item of merchandise to the datacode reading apparatus to read it. Even when the operator performs the datacode reading many times, it may fail. In such a case, the operator cannot recognize the reason why it is impossible to read the datacode.

BRIEF SUMMARY OF THE INVENTION

It is an object of the present invention to provide a datacode reading apparatus capable of allowing an operator to recognize the datacode reading situation and prompting him/her to change the orientation or position of the datacode to reliably read it.

According to a first aspect of the present invention, there is provided.

According to a second aspect of the present invention, there is provided.

According to a third aspect of the present invention, there is provided.

BRIEF DESCRIPTION OF THE SEVERAL VIEWS OF THE DRAWING

FIG. 3 is a flowchart of datacode reading of the apparatus;

FIG. 4 is a view showing a state in which a datacode which is displayed in real time on the display screen of the display of the apparatus is out of the image sensing area of the image sensing device;

FIG. 5 is a view showing a state in which a datacode which is displayed in real time on the display screen of the display of the apparatus is out of the image sensing area of the image sensing device and is excessively tilted; and FIG. 6 is a view showing a state in which a datacode which is displayed in real time on the display screen of the display of the apparatus completely falls within the image sensing area of the image sensing device and faces the image sensing area of the image sensing device.

DETAILED DESCRIPTION OF THE INVENTION

An embodiment of the present invention will now be described with reference to the accompanying drawing.

Figure 1:
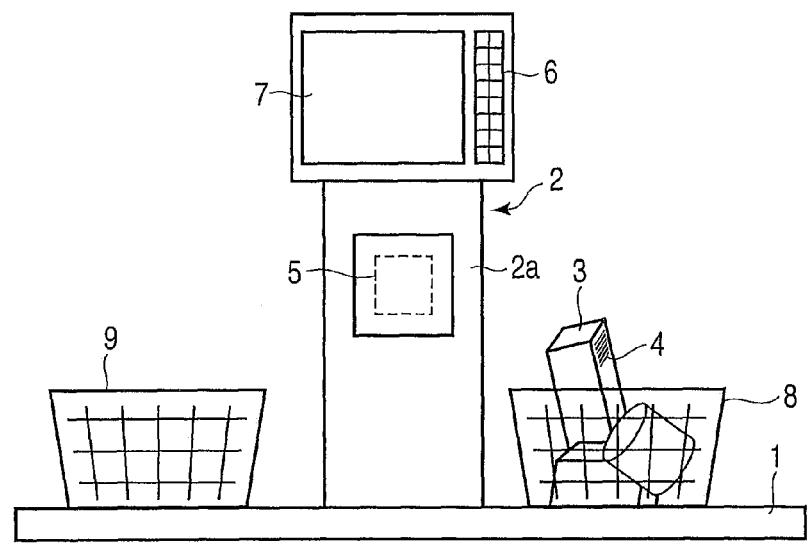
FIG. 1 is a view showing the overall arrangement of a point-of-sales system using an embodiment of a datacode reading apparatus according to the present invention.

FIG. 1 is a perspective view showing the overall arrangement of a point-of-sales (POS) system using a datacode reading apparatus. A datacode reading apparatus 2 is installed at the checkout counter in a store such as a supermarket or a convenience store. The datacode reading apparatus 2 serving as a scanner stands at the center of a sacker table 1. The datacode reading apparatus 2 includes an image sensing device 5. The image sensing device 5 senses a datacode 4 such as a barcode or a QR code attached to an item of merchandise 3.

The datacode reading apparatus 2 also includes a keyboard 6 and a display 7. The keyboard 6 includes various keys to register the datacode 4 of the item of merchandise 3 by the operator's manual operation. The operator uses the keyboard 6 to manually register the datacode 4 of the item of merchandise 3, such as a barcode or a QR code, which cannot be read by the datacode reading apparatus 2 and registered.

The display 7 forms an image display unit to display the name and price of the item of merchandise 3 registered in correspondence with a shopper.

The image sensing device 5 incorporates, e.g., a charge-coupled device (CCD) image sensor. The image sensing device 5 also incorporates an illumination device formed from, e.g., an LED. The illumination device irradiates the image sensing area of the image sensing device 5 with illumination light. The illumination area of the illumination device is larger than the image sensing area of the image sensing device 5. The image sensing area of the image sensing device 5 is illuminated with illumination light from the illumination device. Hence, the image sensing device 5 senses the datacode 4 of the item of merchandise 3 illuminated with illumination light from the illumination device and outputs its moving image data.

The display 7 is provided above, e.g., the image sensing device 5. More specifically, a main body case 2a of the datacode reading apparatus 2 stands at the center of the sacker table 1. The image sensing device 5 is provided at the center of the main body case 2a when viewed from the front side. The image sensing device 5 is arranged at a height position to allow the operator to easily place the item of merchandise 3 held by hand in front of the image sensing device 5.

The display 7 is provided at the upper portion of the main body case 2a. The display 7 is arranged at a height position to enable the operator to easily view it. The display screen of the display 7 is directed in the same direction as the image sensing direction of the image sensing device 5.

That is, the image sensing device 5 and the display 7 are provided such that the operator can easily place the datacode 4 attached to the item of merchandise 3 in the image sensing area of the image sensing device 5. The image sensing device 5 and the display 7 are provided adjacent to each other such that the operator can easily view an image displayed on the display 7 while placing the datacode 4 attached to the item of merchandise 3 in the image sensing area of the image sensing device 5.

Note that the display 7 and the image sensing device 5 may be arranged in, e.g., the horizontal direction. The image sensing direction of the image sensing device 5 is the same as the direction of the display screen of the display 7. That is, the image sensing direction of the image sensing device 5 and the direction of the display screen of the display 7 allow the operator to execute smooth checkout of the item of merchandise 3 in front of the datacode reading apparatus.

A shopping basket 8 is placed upstream of the datacode reading apparatus 2 on the sacker table 1. The shopper will have put, e.g., the plurality of items of merchandise 3 to be bought in the shopping basket 8.

Another shopping basket 9 is placed downstream of the datacode reading apparatus 2 on the sacker table 1. The shopping basket 9 is used to receive the items of merchandise 3 which have undergone merchandise registration. The upstream and downstream sides of the datacode reading apparatus 2 are determined depending on the direction of flow of the items of merchandise 3 in checkout.

Figure 2:
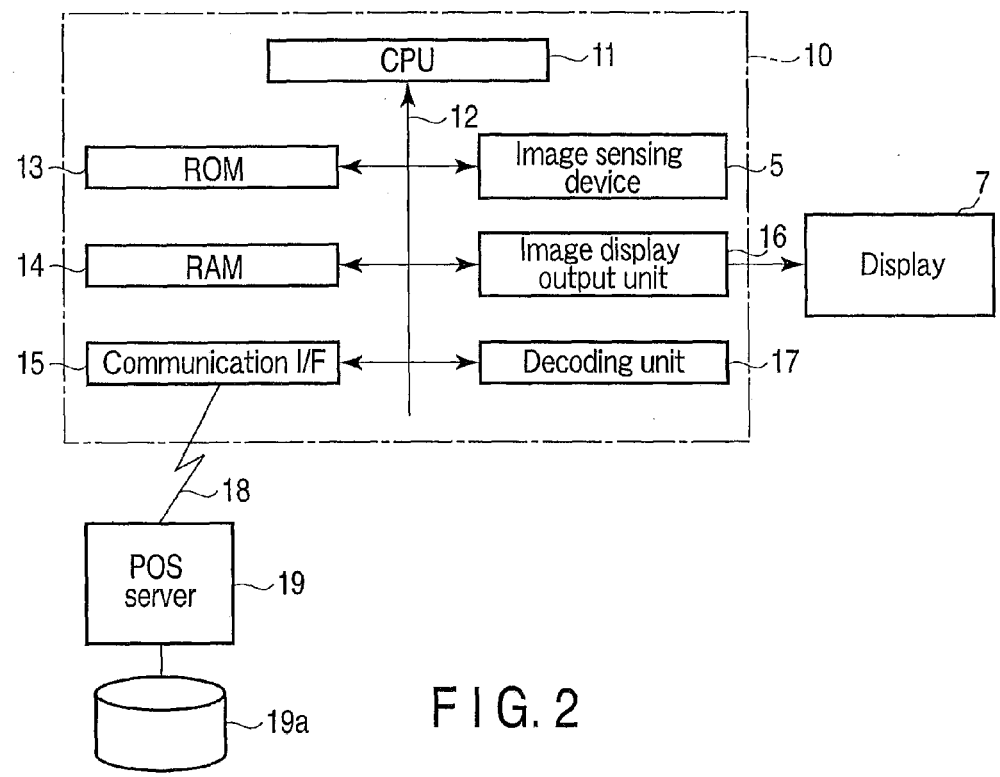
FIG. 2 is a block diagram showing the detailed arrangement of the control system of the apparatus.

FIG. 2 is a block diagram showing the detailed arrangement of a control system 10 of the apparatus. The control system 10 incorporates a central processing unit (CPU) 11 serving as a control unit main body. A read-only memory (ROM) 13, a random access memory (RAM) 14, a communication interface 15, the image sensing device 5, an image display output unit 16, and a decoding unit 17 are connected to the CPU 11 via a bus 12. A POS server 19 is connected to the communication interface 15 via a local area network (LAN) 18 in the store.

The ROM 13 stores, in advance, permanent data such as a checkout program to execute checkout of the item of merchandise 3. The RAM 14 temporarily stores image data acquired upon image sensing of the image sensing device 5 and decoded data as a result of decoding of the datacode 4 attached to the item of merchandise 3. A work area to temporarily store image data and decoded data is formed in the RAM 14.

The image display output unit 16 receives moving image data output from the image sensing device 5, processes the moving image data, and displays it on the display screen of the display 7 as a real-time moving image. The state when the operator directs the datacode 4 attached to the item of merchandise 3 to the image sensing area of the image sensing device 5 is displayed on the display screen of the display 7 as a moving image in real time. Hence, the moving image displayed on the display screen of the display 7 in real time is used to recognize the state when the operator directs the datacode 4 attached to the item of merchandise 3 to the image sensing area of the image sensing device 5.

The display 7 displays, on its display screen, the name and price of the item of merchandise 3 registered in correspondence with the shopper.

Hence, the image display output unit 16 divides the display screen of the display 7 and displays the real-time moving image on one of the divided screens and the name and price of the item of merchandise 3 on the other divided screen. That is, the display 7 displays both the real-time moving image and the name and price of the item of merchandise 3.

Note that two displays 7 may be prepared to display the real-time moving image on one display 7 and the name and price of the item of merchandise 3 on the other display 7. The real-time moving image and the name and price of the item of merchandise 3 may be displayed on the display screen of one display 7 in a superimposed manner.

The decoding unit 17 recognizes, in the moving image data output from the image sensing device 5, e.g., one frame data that enables reading of the entire datacode 4. The decoding unit 17 identifies the datacode 4 from the recognized frame data. The decoding unit 17 decodes the identified datacode 4 into, e.g., a character code and outputs it as decoded data.

The POS server 19 transmits/receives information about checkout processing of the item of merchandise 3 to/from the control system 10 of the datacode reading apparatus, and records the checkout processing result of the item of merchandise 3. The POS server 19 has a merchandise database 19a which stores, e.g., the data of the prices and names of all items of merchandise 3 on sale in the store in advance.

The POS server 19 inquires of the merchandise database 19a about the decoded data of the datacode 4 of the item of merchandise 3, which is transmitted from the control system 10 of the datacode reading apparatus via the LAN 18. Upon inquiring of the merchandise database 19a, the POS server 19 reads, from the merchandise database 19a, the data of the price and name of the item of merchandise 3 corresponding to the decoded data of the datacode 4 of the item of merchandise 3. The POS server 19 totalizes the prices of all items of merchandise 3 based on the read data of the price and name of each item of merchandise 3 to obtain checkout data, and returns the checkout data to the control system 10 of the datacode reading apparatus via the LAN 18.

The checkout operation of the apparatus having the above-described arrangement will be described next with reference to the datacode reading flowchart shown in FIG. 3.

The operator removes the items of merchandise 3 from the shopping basket 8 one by one. The operator places the datacode 4 attached to the item of merchandise 3 in the image sensing area of the image sensing device 5 so that the image sensing device 5 senses the datacode 4 attached to the item of merchandise 3.

In step S1, the image sensing device 5 always performs the image sensing operation and outputs moving image data. When the item of merchandise 3 and the datacode 4 attached to it enter the image sensing area of the image sensing device 5, the image sensing device 5 senses the item of merchandise 3 and the datacode 4 attached to it and outputs moving image data.

In step S2, the image display output unit 16 receives moving image data output from the image sensing device 5, processes the moving image data, and displays it on the display screen of the display 7 as a real-time moving image. FIGS. 4 and 5 show examples of the instantaneous image of one scene in the moving image which is displayed in real time on the display screen of the display 7. FIG. 4 shows a state in which the datacode 4 is out of the image sensing area of the image sensing device 5. FIG. 5 shows a state in which the datacode 4 is out of the image sensing area of the image sensing device 5 and is excessively tilted with respect to the image sensing direction of the image sensing device 5. In addition, an image of the datacode 4 which is attached to the item of merchandise 3 and directed to the image sensing area of the image sensing device 5 by the operator is displayed in real time on the display screen of the display 7 as a moving image.

When the datacode 4 is out of the image sensing area of the image sensing device 5 or is excessively tilted with respect to the image sensing device 5, as described above, the decoding unit 17 cannot read the entire datacode 4 in, e.g., the moving image data output from the image sensing device 5.

If it is impossible to read the entire datacode 4, the operator views the display screen of the display 7 to recognize that the entire datacode 4 cannot be read. The state when the datacode 4 is directed to the image sensing area of the image sensing device 5 is displayed in real time on the display screen of the display 7. Hence, the operator can recognize in real time the position and orientation of the datacode 4 directed to the image sensing area of the image sensing device 5.

As a result, the operator can recognize the reason why it is impossible to read the entire datacode 4. For example, the operator can immediately recognize that the datacode 4 is out of the image sensing area of the image sensing device 5, as shown in FIG. 4, or the datacode 4 is out of the image sensing area of the image sensing device 5 and is excessively tilted with respect to the image sensing area of the image sensing device 5, as shown in FIG. 5.

The operator can change the position and orientation of the item of merchandise 3 to read the entire datacode 4 while viewing the moving image of the datacode 4 which is displayed on the display screen of the display 7 in real time.

Consequently, the operator can place the entire datacode 4 in the image sensing area of the image sensing device 5, as shown in FIG. 6, i.e., direct the datacode 4 attached to the item of merchandise 3 to the image sensing area of the image sensing device 5 such that it almost perpendicularly faces the image sensing area of the image sensing device 5 by changing the position and orientation of the item of merchandise 3 held by hand.

The datacode 4 is directed to the image sensing area of the image sensing device 5 such that the entire datacode 4 falls within the image sensing area of the image sensing device 5 and perpendicularly faces the image sensing area of the image sensing device 5. In step S3, the decoding unit 17 recognizes, in the moving image data output from the image sensing device 5, e.g., one frame data that enables reading of the entire datacode 4. The decoding unit 17 identifies the datacode 4 from the recognized frame data, decodes the identified datacode 4 into, e.g., a character code, and outputs it as decoded data.

In step S4, the CPU 11 transmits the decoded data of the datacode 4 decoded by the decoding unit 17 from the communication interface 15 to the POS server 19 via the LAN 18.

The POS server 19 receives the decoded data of the datacode 4 of the item of merchandise 3 from the control system 10 of the datacode reading apparatus 2 via the LAN 18. The POS server 19 inquires of the merchandise database 19*a* about the decoded data of the datacode 4 of the item of merchandise 3 and reads the data of the price and name of the item of merchandise 3 corresponding to the decoded data. The POS server 19 totalizes the prices of all items of merchandise 3 based on the read data of the price and name of each item of merchandise 3 to obtain checkout data, and returns the checkout data to the control system 10 of the datacode reading apparatus via the LAN 18.

The CPU 11 receives the checkout data representing the sum of the prices of all items of merchandise 3, which is returned to the control system 10, via the communication interface 15, and displays the checkout data representing the sum of the prices of all items of merchandise 3 on the display 7.

According to the above-described embodiment, moving image data output from the image sensing device 5 is input. The image display output unit 16 processes the moving image data and displays it on the display screen of the display 7 as a real-time moving image. The operator can recognize in real time the position and orientation of the datacode 4 directed to the image sensing area of the image sensing device 5 by viewing the display screen of the display 7. The operator can immediately recognize the reason why it is impossible to read the entire datacode 4 by recognizing the position and orientation of the datacode 4 directed to the image sensing area of the image sensing device 5. For example, the datacode 4 may be out of the image sensing area of the image sensing device 5, as shown in FIG. 4, or the datacode 4 ma be out of the image sensing area of the image sensing device 5 and be excessively tilted with respect to the image sensing area of the image sensing device 5, as shown in FIG. 5.

Hence, recognizing that the datacode 4 attached to the item of merchandise 3 is directed to the image sensing area of the image sensing device 5, the operator can properly change the position and orientation of the item of merchandise 3 to read the entire datacode 4.

As a result, the operator can place the entire datacode 4 in the image sensing area of the image sensing device 5, as shown in FIG. 6. The operator can direct the datacode 4 attached to the item of merchandise 3 to the image sensing area of the image sensing device 5 such that it almost perpendicularly faces the image sensing area of the image sensing device 5.

It is therefore possible to prevent any situation that when the operator directs the datacode 4 attached to the item of merchandise 3 to the datacode reading apparatus to read it, reading of the datacode 4 fails, and the reading operation of the datacode 4 needs to be performed many times.

The image sensing device 5 and the display 7 are provided adjacent to each other. The display 7 is provided, e.g., above the image sensing device 5. The operator can easily place the datacode 4 attached to the item of merchandise 3 in the image sensing area of the image sensing device 5 and easily view an image displayed on the display 7 while placing the datacode 4 attached to the item of merchandise 3 in the image sensing area of the image sensing device 5.

For example, the datacode 4 may be out of the image sensing area of the image sensing device 5, as shown in FIG. 4. Alternatively, the datacode 4 may be out of the image sensing area of the image sensing device 5 and be excessively tilted with respect to the image sensing area of the image sensing device 5, as shown in FIG. 5. Even in this state, the operator can immediately place the entire datacode 4 in the image sensing area of the image sensing device 5, as shown in FIG. 6. The operator can immediately direct the datacode 4 attached to the item of merchandise 3 to the image sensing area of the image sensing device so that it almost perpendicularly faces the image sensing area of the image sensing device 5. This increases the efficiency of checkout of the item of merchandise 3.

Note that a self POS system is used to check out the item of merchandise 3. The self POS system requires no operator at a checkout counter in a store. In the self POS system, each shopper himself/herself places the datacode 4 attached to the item of merchandise 3 in the image sensing area of the image sensing device 5 to check out the item of merchandise 3.

The shopper is unaccustomed to checkout of the item of merchandise 3 by placing the datacode 4 attached to the item of merchandise 3 in the image sensing area of the image sensing device 5.

The datacode reading apparatus 2 is provided in the self POS system. Even in the self POS system, moving image data output from the image sensing device 5 is input so that the image display output unit 16 processes the moving image data and displays it on the display screen of the display 7 as a real-time moving image.

The shopper who uses the self POS system can recognize in real time the position and orientation of the datacode 4 directed to the image sensing area of the image sensing device 5 by viewing the display screen of the display 7. For example, the shopper can place the entire datacode 4 in the image sensing area of the image sensing device 5, as shown in FIG. 6. The shopper can also direct the datacode 4 attached to the item of merchandise 3 to the image sensing area of the image sensing device 5 such that it almost perpendicularly faces the image sensing area of the image sensing device 5.

This allows even the shopper, who is unaccustomed to checkout of the item of merchandise 3 by placing the datacode 4 attached to the item of merchandise 3 in the image sensing area of the image sensing device 5, to smoothly execute checkout of the item of merchandise 3 by himself/herself in the self POS system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A datacode reading apparatus comprising:
    an image sensing device that senses at least a datacode positioned before an image sensing surface of the image sensing device and outputs moving image data;
    an image display unit that includes a display screen and displays, on the display screen, the moving image data output from the image sensing device as a real-time moving image; and
    a decoder that decodes the datacode based on the moving image data output from the image sensing device:
    wherein the datacode reading apparatus stands on a table; and
    wherein the image sensing surface and the display screen face the same direction.

2. The datacode reading apparatus according to claim 1, wherein the image sensing device and the image display unit are provided adjacent to each other.

3. The apparatus according to claim 1, wherein the display screen of the image display unit is used to exclusively display the real-time moving image or display both the moving image and registration information on an item of merchandise having the datacode.

4. The datacode reading apparatus according to claim 1, wherein the image display unit displays, on the display screen in real time, the moving image to recognize a state when the datacode is directed to an image sensing area of the image sensing device.

5. The datacode reading apparatus according to claim 1, wherein the image display unit displays, as moving image data on the display screen, at least one of the datacode that is partially out of an image sensing area of the image sensing device, the datacode that is tilted with respect to an image sensing direction of the image sensing device, and the datacode which completely falls within the image sensing area of the image sensing device and almost perpendicularly faces the image sensing area of the image sensing device.

6. The datacode reading apparatus according to claim 2, wherein the image display unit is above the image sensing device.

7. The datacode reading apparatus according to claim 2, wherein the image display unit and the image sensing device are arranged in the horizontal direction.

8. The datacode reading apparatus according to claim 3, further comprising:
    an image display output unit that divides the display screen and displays the real-time moving image on one of the divided screens and the registration information on the other divided screen.

9. The datacode reading apparatus according to claim 3, further comprising:
    an image display output unit that displays the real-time moving image and the registration information on the display screen in a superimposed manner.

10. A datacode reading apparatus comprising:
    a display screen mounted to a support configured to be seated on a table;
    an image sensing device mounted to the support, the image sensing device configured to sense a datacode positioned before an image sensing surface of the image sensing device and output moving image data;
    an image display output unit configured to display on the display screen moving image data output from the image sensing device as a real-time moving image; and
    a decoder configured to decode the datacode based on the moving image data output from the image sensing device;
    wherein the image sensing surface and the display screen face the same direction.

11. The datacode reading apparatus of claim 10, wherein the image sensing device is mounted to the support between the display screen and the table.

12. The datacode reading apparatus of claim 10, wherein the table includes a first shopping basket support area on a first side of the support and a second shopping basket support area on a second side of the support that is opposite to the first side.

13. The datacode reading apparatus of claim 10, further comprising a keypad mounted to the display screen.

14. The datacode reading apparatus of claim 10, wherein the image display output unit is configured to display registration information on an item of merchandise including the datacode.

15. A datacode reading apparatus comprising:
    a sacker table;
    a support mounted to and extending from the sacker table;
    a display screen mounted to the support;
    an image sensing device mounted to the support between the table and the display screen, the image sensing device configured to sense a datacode positioned before an image sensing surface of the image sensing device and output moving image data;
    an image display output unit configured to display on the display screen moving image data output from the image sensing device as a real-time moving image; and a decoder configured to decode the datacode based on the moving image data output from the image sensing device;

wherein the image sensing surface and the display screen face the same direction.

16. The datacode reading apparatus of claim 15, wherein the sacker table includes a first shopping basket support area on a first side of the support and a second shopping basket support area on a second side of the support that is opposite to the first side.

17. The datacode reading apparatus of claim 16, further comprising a keypad mounted to the display screen.

18. The datacode reading apparatus of claim 17, wherein the image display output unit is configured to display registration information on an item of merchandise bearing the datacode.

* * * * *